Aug. 2, 1960 — F. LAIST — 2,947,605
PRODUCTION OF ALUMINA
Filed Oct. 22, 1956
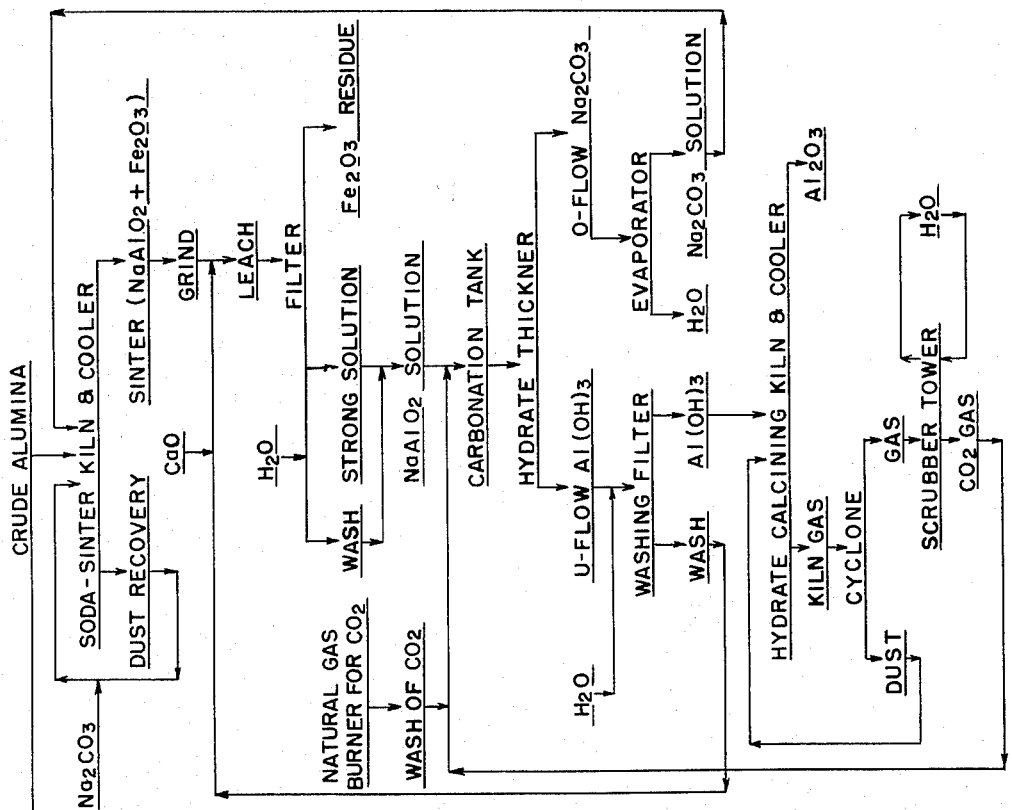
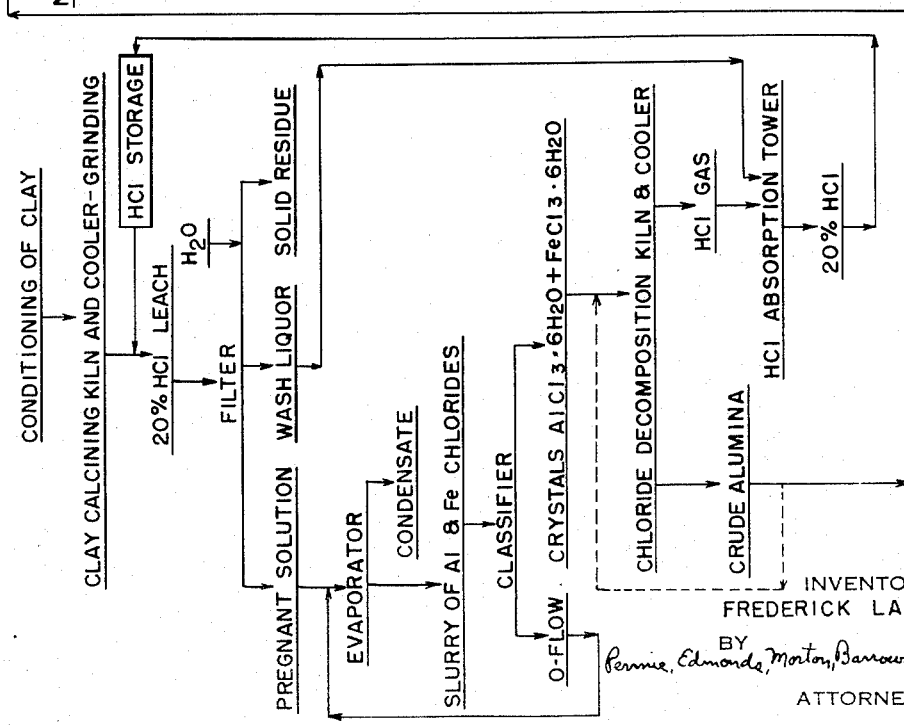
INVENTOR
FREDERICK LAIST
BY Pennie, Edmonds, Morton, Barrows, Taylor
ATTORNEYS

United States Patent Office 2,947,605
Patented Aug. 2, 1960

2,947,605

PRODUCTION OF ALUMINA

Frederick Laist, Los Angeles, Calif., assignor to The Anaconda Company, New York, N.Y., a corporation of Montana Filed Oct. 22, 1956, Ser. No. 617,614

5 Claims. (Cl. 23—143)

This invention relates to the production of alumina from clays. More particularly the invention is concerned with the production from clay of a high grade, substantially silica- and iron-free alumina suitable as feed in the electrolytic aluminum reduction process.

Bauxite, the principal ore of alumina ($Al_2O_3$), has heretofore been, and is presently, the main source of alumina as feed in the electrolytic production of aluminum. Clay has long been recognized as another possible source of high grade alumina, and various proposals have heretofore been advanced for producing such alumina from clays. In clay, alumina is combined with silica ($SiO_2$), generally in the form of a hydrous silicate of alumina (e.g. $Al_2O_3 \cdot 2SiO_2 \cdot 2H_2O$). Clays further contain varying amounts of other constituents, frequently referred to as impurities, such as excess silica, iron (Fe) compounds etc. The present invention contemplates an improved method of producing a high grade alumina product substantially free of silica and iron, from clays containing varying amounts of silica and iron.

The method of the invention involves two stages of treatment in the first of which silica is removed from the clay and a crude alumina containing ferric oxide ($Fe_2O_3$) is produced, and in the second of which the ferric oxide is eliminated and a high grade alumina product is produced. Basically, the first stage treatment involves calcining the clay at an elevated temperature, say at least 1000° F. (and preferably 1100–1300° F.), to render the alumina soluble in dilute hydrochloric acid (HCl). The calcined clay is leached with an aqueous solution of hydrochloric acid of a concentration of about 20% HCl to dissolve aluminum and iron as chlorides, leaving practically all of the silica in the insoluble leach residue. Following filtration, or other suitable solids-liquid separatory step, the solution of aluminum and iron chlorides is concentrated by evaporation to produce a crystal slurry or magma of aluminum and iron chlorides ($AlCl_3 \cdot 6H_2O + FeCl_3 \cdot 6H_2O$). This crystal slurry, after suitable conditioning if necessary or desired, is calcined at an elevated temperature, say at least 1500° F. (and preferably 1700–1900° F.), in the course of which the chlorides are decomposed into oxides with the evolution of hydrogen chloride (hydrochloric acid gas) which is recovered for reuse in the treatment of further calcined clay. The calcine is a practically silica-free crude alumina usually containing about 85% (plus or minus 5%) $Al_2O_3$ and 15% (plus or minus 5%) $Fe_2O_3$, depending on the quality of the clay feed, and constitutes the feed of the second stage treatment.

The crude alumina, consisting principally of the oxides of aluminum and iron (e.g. in the relative proportions of around 6 to 1), is sintered in the presence of sodium carbonate or soda ash ($Na_2CO_3$) at a temperature of at least 1500° F. (and preferably 1700–1900° F.), in the course of which the aluminum oxide is converted into water-soluble sodium aluminate ($NaAlO_2$) while the iron is retained in the resulting calcine as insoluble ferric oxide. For convenience this operation is herein designated the soda-sinter step. The sinter of this step is leached to dissolve the sodium aluminate and the resulting solution is separated from the insoluble leach residue consisting mainly of ferric oxide. The solution of sodium aluminate is treated with carbon dioxide gas in the course of which aluminum hydroxide ($Al(OH)_3$) is precipitated and sodium carbonate is regenerated for reuse in the soda-sinter step. The precipitated aluminum hydroxide, after washing if necessary or desired, is dehydrated by calcination at an elevated temperature, say at least 1600° F. (and preferably 1700–2100° F.); the resulting calcine being a high grade, substantially silica- and iron-free alumina suitable as feed to the pot line of an electrolytic aluminum reduction plant.

The purpose of the (first stage) hydrochloric acid extraction treatment is to produce a crude alumina product, free of silica, for a succeeding purification treatment. Metallurgically the alumina and iron in the calcined clay are soluble in 20% hydrochloric acid, while silica is insoluble. The chlorides of aluminum and iron (after separation from the silica residue and suitable dehydration) are decomposed by thermal treatment to yield a crude alumina product (contaminated with iron oxide in proportion to its occurrence in the clay) and hydrogen chloride gas. This gas is absorbed in an intermediate wash liquor and recovered as 20% hydrochloric acid for reuse in the treatment of further calcined clay. The (second stage) soda-sinter purification treatment requires the absence of silica which would be solubilized in the soda-sinter step. Since the silica in the initial clay is eliminated by the hydrochloric acid extraction treatment, the crude alumina product is amenable to the soda-sinter treatment. In the soda-sinter step, the alumina is solubilized as sodium aluminate, while iron remains as insoluble ferric oxide and is eliminated by leaching the soda-sinter. Through the successive steps of the purification treatment, a high great alumina, free of silica and iron, is obtained from the sodium aluminate.

The invention will be better understood from the following description taken in conjunction with the accompanying drawing, in which the single figure is a diagrammatic flow sheet of the main features in the first and second stage treatments of the method of the invention.

The raw or green clay is prepared for calcination in appropriate steps of sizing and conditioning. Thus, the clay may be first reduced to lumps of about ¾ inch in size, in a plurality of stages of size reduction. The sized material is advantageously conditioned in a pug mill, and then passed through a cutter or shredder. The thus-conditioned clay is dried and calcined in any suitable type of kiln, preferably at a temperature of about 1200° F. with a retention period of about 1½ hours at that temperature. If the clay is sticky, a certain proportion of dried or calcined clay may be mixed therewith and circulated through the drying and calcining kiln. Dust from the calcining kiln may be collected and returned to the conditioned step following sizing, and a product cooler may be operatively associated with the kiln. The calcined clay is ground to a nominal particle size of about 65 mesh Tyler screen series, advantageously in a 2-stage open circuit ball mill.

The ground calcined clay is leached with hydrochloric acid at a concentration of about 20% HCl. Leaching is advantageously carried out at a temperature of at least 160° F., and preferably as near the boiling temperature as practical, with mechanical agitation of the slurry for about one hour. Calcination breaks up the aluminum silicate of the clay into alumina and silica, and the alumina is dissolved by the hydrochloric acid in the leaching step. Leaching also dissolves the iron in the clay, so that leaching produces a solution of aluminum and iron chlorides and a solid residue consisting largely of silica. The solution of chlorides is separated from the solid residue in any suitable type of solids-liquid separator, such as a wet cyclone or filter or a combination thereof, to produce a clarified pregnant solution of aluminum chloride and iron chloride, filter wash liquor and the washed solid residue; the wash liquor being delivered to the HCl absorption tower and the solid residue discharged to waste.

The pregnant solution of aluminum chloride and iron chloride is evaporated in any suitable manner, as for example by vacuum evaporation or the like, to produce a mixed crystal slurry or magma and an aqueous condensate. When, as usual, the crystal slurry contains free hydrochloric acid, the aqueous condensate from the evaporator will contain sufficient hydrochloric acid to warrant its recovery and return to the process, e.g. as filter wash liquor or (if sufficiently concentrated) as aqueous absorbing medium in the HCl absorption tower.

The mixed crystal slurry (usually around 25–30% solids) from the evaporator is treated in a classifier (e.g. bowl classifier) with the overflow thereof being returned to the evaporator. The drained crude crystals (usually around 50–60% solids) may advantageously be conditioned in a pug mill preparatory to delivery to the chloride decomposition kiln, as for example in a pug mill type kiln feeder. The kiln is provided with a product cooler, dust collector and means for returning to the kiln dust and (if desired) a certain proportion of the calcined product. In this kiln, the mixed aluminum and iron chloride crystals are dried and calcined, preferably at a temperature of about 1700° F., for about 1 hour, in the course of which the chlorides are decomposed into aluminum and iron oxides and hydrogen chloride gas. The calcined product of this heat-treatment constitutes the crude alumina which is purified in the second treatment stage of the present method. The gaseous product of the chloride decomposition kiln is preferably passed through suitable dust recovery equipment; the dust being returned to the kiln and the dust-free gas delivered to the HCl absorption tower. In the absorption tower, hydrogen chloride gas is condensed in an aqueous absorbing medium such as an aqueous solution of hydrochloric acid. This may advantageously be done by maintaining the acid absorbing medium near its boiling temperature. By operating the HCl absorption tower near the boiling temperature of the acid absorbing medium, steam will pass through and out of the tower to the stack, while most of the hydrogen chloride will be absorbed and recovered, provided the HCl concentration of the effluent acid does not exceed 20%, which is the concentration at which an aqueous solution of hydrochloric acid is stable, that is the HCl concentration of such a solution is unchanged by boiling.

The crude alumina produced in the first stage is ground, say to nominal 100 mesh, and the ground product is subjected to a sintering heat-treatment in the presence of sodium carbonate. The sodium carbonate may advantageously be mixed with the crude alumina in the form of a concentrated aqueous solution recovered from the process as hereinafter described. Make-up sodium carbonate may be added dry to and mixed with the soda-sinter charge. The sintering operation is preferably carried out at a temperature within the range of 1700 and 1900° F. with a retention period of about one hour at that temperature in any appropriate type of kiln, preferably provided with a pug mill type feeder, cyclone dust collector and return, and product cooler.

In the course of sintering substantially all of the alumina is converted to water-soluble sodium aluminate, while the iron remains in the sinter as insoluble ferric oxide. The sintered product is leached, preferably with hot wash water from subsequent clarification operations to dissolve the sodium aluminate, which is separated from the insoluble sinter residue (largely $Fe_2O_3$) by filtration. If desired, the filtrate may be further clarified in a polishing filter or the like. The clarified sodium aluminate solution is delivered to a carbonation tank for treatment with carbon dioxide gas which may advantageously be obtained from the aluminum hydrate calcining kiln and/or from a natural gas burner or the like.

In the carbonation tank, sodium aluminate reacts with carbon dioxide to form a precipitate of aluminum hydroxide and water-soluble sodium carbonate. The slurry from the tank is delivered to a hydrate thickener (or other suitable solids-liquid separator) from which the aluminum hydroxide is discharged in the underflow and the sodium carbonate in the overflow. By evaporation the sodium carbonate overflow is concentrated to a suitable degree for return to the soda-sinted treatment of crude alumina. The aluminum hydroxide underflow is washed and filtered, and the wash water is utilized in the leaching of soda-sinter product.

The washed aluminum hydroxide is calcined in any suitable type of kiln preferably provided with a cyclone dust collector, calcine return means and product cooler, at a temperature within the range of 1700 and 2100° F. and preferably about 1800° F. with a retention period of about one hour at that temperature. The kiln is preferably gas-fired, or may even be oil-fired, rather than coal-fired to avoid ash contamination. The calcine consists of purified alumina, practically silica-free and analyzing (dry weight) 99+% $Al_2O_3$ and insignificant amounts of $Fe_2O_3$ and $Na_2O$. Dust from the gaseous product (kiln gas) of the calcining kiln is recovered in a cyclone and may be returned to the kiln, and the carbon dioxide in the residual gas (after passing the gas through a scrubber tower) is utilized in the aforementioned carbonation tank.

The sodium aluminate produced in the soda-sinter kiln has a high degree of water-solubility. The reaction during leaching of the soda-sinter product is strongly exothermic and leaching is preferably carried out at a temperature as near the boiling point as practical and at least above 160° F.

Optimum operating results are obtained by observing the aforementioned preferred temperature ranges of the various calcining operations. Thus, clay calcined at temperatures below 1000° F. does not give good extraction of alumina in 20% hydrochloric acid. On the other hand, at calcining temperatures of 1500° F. and higher, alumina and silica fuse and form a fixation compound insoluble in 20% hydrochloric acid. Accordingly, in practicing the invention, it is desirable to avoid these unfavorable temperatures, and hence the clay calcining kiln is preferably operated within the temperature range of 1100 and 1300° F.

The chloride decomposition kiln should be operated at a temperature above 1500° F. to minimize the amount of residual chlorine in the crude alumina. At a calcining temperature of 1700° F. the crude alumina is substantially free of chlorine (e.g. 0.1% or less). Hence, the chloride decomposition kiln is operated within the temperature range of 1700 and 1900° F. for optimum results.

The soda-sinter step should be carried out at a temperature of at least 1600° F. since lower-temperatures do not give good conversion to sodium aluminate. Sintering at a temperature much above 1900° F. gives a more glazed, less granular product of relatively lower water-solubility. Hence, the preferred temperature of the soda-sinter step is within the range of 1700 and 1900° F., within which temperature range the color of the product is a very pale green off-white.

If the temperature of calcination of the aluminum hydrate is too low, that is lower than 1600° F., the calcined alumina is hygroscopic. Optimum results are obtained within the temperature range of 1700 and 2100° F. Calcining temperatures near the higher end of the range, and even above 2100° F., make possible desirable particle size control.

Depending on current and local economics, the sodium compound required for practicing the invention may be supplied by sodium hydroxide rather than sodium carbonate as hereinbefore described. If the sodium compound is introduced into the circuit as sodium hydroxide, it will be necessary to carbonate it before inclusion in the soda-sinter charge. This may be done by silica-free carbon dioxide gas recovered from the hydrate calcining kiln, from a gas-fired steam boiler stack of the plant, or the like. Both the sodium hydroxide and the hydrochloric acid, required in practicing the invention, may be locally made by electrolysis of sodium chloride as conventionally practiced, and carbon dioxide for carbonating the sodium hydroxide may be supplied as aforesaid.

Various types of equipment may be used in carrying out the individual steps of the method, and apparatus herein specifically described or indicated on the flow sheet are illustrative and in no manner restrictive. The equipment in the aluminum chloride-ferric chloride and free hydrochloric acid circuits must be resistant to corrosive attack, and to this end presently available rubber, plastic and ceramic types of materials-of-construction are adequate. Aside from pumps, the movements of liquid are relatively slow, and where necessary rubber-lined equipment is readily available therefor. The use of expensive special alloys is a minor item of equipment cost. Drying, calcining and sintering may advantageously be carried out in rotary kilns, although other types of kilns and furnaces may be used. Leaching is carried out at temperatures that do not require autoclaving, and hence open tanks provided with mechanical agitation are entirely satisfactory. Filtration is preferably (but not necessarily) carried out in vacuum type equipment, preceded where practical by thickening or clarification to reduce as far as possible the areas of filter surface required. Thickening may be carried out in wet cyclones, thickeners, clarifiers or the like. Evaporation is preferably carried out in vacuum type evaporators.

The following example illustrates a practice of the invention with an Idaho clay containing (as mined) 25–30% free moisture ($H_2O$), and analyzing (dry weight) about 26% $Al_2O_3$, about 5.7% $Fe_2O_3$, about 54% $SiO_2$; the balance being mainly combined water. The example is purely illustrative and not restrictive of the invention. The dried clay was calcined for 1½ hours at a temperature of 1150° F., with a calcining weight loss of about 12%. The calcined clay analyzed about 30% $Al_2O_3$, about 6.5% $Fe_2O_3$ and the balance mostly $SiO_2$ and was ground to nominal 65 mesh (i.e. 3–5% on and the balance through 65 mesh) with 11% by weight plus 100 mesh and 62% by weight minus 200 mesh.

The calcined clay was leached with mechanical agitation for 1 hour at a temperature of about 210° F. with an aqueous solution of hydrochloric acid of 20% HCl concentration; about 65 parts by weight of 100% HCl being initially present for each 100 parts by weight of calcined clay. After solids-liquid separatory steps of thickening, clarification and filtering, 82% of the $Al_2O_3$ in the calcined clay was recovered in the pregnant solution as $AlCl_3$. By analysis, the pregnant solution contained 75 g./l. (grams per liter) of $Al_2O_3$, 7.8 g./l. Fe and 5.4 g./l. of free HCl. The total loss of hydrochloric acid in the acid extraction treatment was about 2.5%.

The pregnant solution of aluminum and iron chlorides was subjected to vacuum evaporation, followed by washing and draining of the resulting crystal slurry. The crystal slurry as fed to the chloride decomposition kiln analyzed 56% $AlCl_3 \cdot 6H_2O$; 7.5% $FeCl_3 \cdot 6H_2O$, 10% $AlCl_3$, 1.5% $FeCl_3$ and 25% free $H_2O$, being thus about 50% solids. The kiln was maintained at a temperature of 1700–1800° F. and the detention period of the charge at that temperature was 1 hour. The calcine (crude alumina) analyzed about 84% $Al_2O_3$, about 16% $Fe_2O_3$, less than 0.1% residual chlorine, and negligible silica. About 97% of the hydrogen chloride in the gaseous product of the chloride decomposition kiln was recovered in the 20% HCl effluent of the HCl absorption tower. The over-all loss of HCl was about 4%, and this amount of make-up acid (as 100% HCl) was included in the 20% HCl leach liquor for the chloridizing leaching of the calcined clay.

The crude alumina was ground to nominal 100 mesh, and mixed with recycled sodium carbonate solution and make-up sodium carbonate, in the proportion by weight of about 40% crude alumina, 50% $Na_2CO_3$ in recycled solution and 10% make-up $Na_2CO_3$. This mixture was sintered at a temperature of 1900° F. for 1 hour, in the course of which the alumina was converted to sodium aluminate while iron remained unchanged in the sinter as $Fe_2O_3$. The sinter product analyzed 42.3% $Al_2O_3$, 25.6% $Na_2O$, 23.8% $Na_2CO_3$ (free) and 8.3% Fe, and was ground to nominal 100 mesh. The ground sinter was leached with water (filter wash water) at a temperature of about 210° F. in about one-half hour's time.

The sodium aluminate filtrate was carbonated by carbon dioxide in the scrubbed gaseous product of a natural gas burner. The precipitated aluminum hydroxide was thickened, washed and calcined at a temperature of 1800° F. to produce the final high grade alumina, 75% of the alumina content of the original clay being recovered in this product. The thickener overflow and filter wash waters were collected for recovery of sodium carbonate. The sodium carbonate liquors were concentrated by evaporation to an $Na_2CO_3$ concentration of 212 g./l. and then recycled to the soda-sinter kiln feed.

The final high grade alumina product was substantially free of silica and iron, and admirably adapted as the feed to electrolytic reduction furnaces.

I claim:

1. In the method of producing substantially silica-free and iron-free alumina from an iron-containing clay in which an iron-containing crude alumina substantially free of silica is first produced by calcining the clay, leaching the calcine with hydrochloric acid, separating the siliceous residue from the leach solution, and crystallizing aluminum and iron chlorides from the leach solution, the improvement which comprises subjecting said chloride crystals to calcination at a temperature within the range of 1500 and 1900° F. and thereby producing an iron-containing crude alumina substantially free of both silica and residual chloride, sintering said crude alumina in the presence of sodium carbonate at a temperature in excess of 1500° F. and thereby converting the alumina to sodium aluminate while retaining the iron as oxide in the resulting sinter product, separating the sodium aluminate from the iron oxide residue associated therewith by leaching with an aqueous medium, recovering substantially silica-free and iron-free alumina from the aqueous solution of sodium aluminate, recovering substantially chloride-free sodium carbonate from the residual aqueous leach solution, and recycling the recovered sodium carbonate for sintering with a further quantity of iron-containing crude alumina.

2. The improvement according to claim 1 in which the crude alumina is sintered in the presence of sodium carbonate at a temperature within the range of 1700 and 1900° F.

3. In the method of producing substantially silica-free and iron-free alumina from an iron-containing clay in which an iron-containing crude alumina substantially free of silica is first produced by calcining the clay, leaching the calcine with hydrochloric acid, separating the siliceous residue from the leach solution, and crystallizing aluminum and iron chlorides from the leach solution, the improvement which comprises subjecting said chloride crystals to calcination at a temperature within the range of 1700 and 1900° F. and thereby producing an iron-containing crude alumina containing less than 0.1% of residual chloride and negligible silica, sintering said crude alumina in the presence of sodium carbonate at a temperature within the range of 1700 and 1900° F. and thereby converting the alumina to sodium aluminate while retaining the iron as oxide in the resulting sinter product, separating the sodium aluminate from the iron oxide residue associated therewith by leaching with an aqueous medium at a temperature exceeding 170° F., recovering substantially silica-free and iron-free alumina from the aqueous solution of sodium aluminate, recovering substantially chloride-free sodium carbonate from the residual aqueous leach solution, and recycling the recovered sodium carbonate for sintering with a further quantity of iron-containing crude alumina.

4. In the method of producing substantially silica-free and iron-free alumina from an iron-containing clay in which an iron-containing crude alumina substantially free of silica is first produced by calcining the clay, leaching the calcine with hydrochloric acid, separating the siliceous residue from the leach solution, and crystallizing aluminum and iron chlorides from the leach solution, the improvement which comprises subjecting said chloride crystals to calcination at a temperature within the range of 1500 to 1900° F. and thereby producing an iron-containing crude alumina substantially free of both silica and residual chloride, sintering said crude alumina in the presence of sodium carbonate at a temperature in excess of 1500° F. and thereby converting the alumina to sodium aluminate while retaining the iron as oxide in the resulting sinter product, leaching the sinter product with an alkaline aqueous medium to dissolve the sodium aluminate and separating the resulting leach solution from the insoluble iron oxide residue, treating the separated leach solution with carbon dioxide to precipitate alumina therefrom and to regenerate sodium carbonate in solution, separating the alumina from the solution and washing it free from adhering leach solution to produce a silica-free, iron-free and chloride-free alumina product, recovering substantially chloride-free sodium carbonate from the leach solution and recycling it for sintering with a further quantity of iron-containing crude alumina, and employing the wash liquor from the alumina for leaching a further quantity of sodium carbonate sinter product.

5. In the method of producing substantially silica-free and iron-free alumina from an iron-containing clay in which an iron-containing crude alumina substantially free of silica is first produced by calcining the clay, leaching the calcine with hydrochloric acid, separating the siliceous residue from the leach solution, and crystallizing aluminum and iron chlorides from the leach solution, the improvement which comprises subjecting said chloride crystals to calcination at a temperature within the range of 1700 to 1900° F. and thereby producing an iron-containing crude alumina containing less than 0.1% of residual chloride and negligible silica, sintering said crude alumina in the presence of sodium carbonate at a temperature within the range of 1700 and 1900° F. and thereby converting the alumina to sodium aluminate while retaining the iron as oxide in the resulting sinter product, leaching the sinter product with an alkaline aqueous medium at a temperature exceeding 170° F. to dissolve the sodium aluminate and separating the resulting leach solution from the insoluble iron oxide residue, treating the separated leach solution with carbon dioxide to precipitate alumina therefrom and to regenerate sodium carbonate in solution, separating the alumina from the solution and washing it free from adhering leach solution to produce a silica-free, iron-free and chloride-free alumina product, recovering substantially chloride-free sodium carbonate from the leach solution and recycling it for sintering with a further quantity of iron-containing crude alumina, and employing the wash liquor from the alumina for leaching a further quantity of sodium carbonate sinter product.

References Cited in the file of this patent

UNITED STATES PATENTS

| | | |
|---|---|---|
| 1,341,901 | Hayward | June 1, 1920 |
| 1,918,735 | Bradley et al. | July 18, 1933 |
| 1,926,744 | James | Sept. 12, 1933 |
| 2,376,696 | Hixson et al. | May 22, 1945 |
| 2,398,425 | Haff | Apr. 16, 1946 |
| 2,408,241 | Sturbelle | Sept. 24, 1946 |
| 2,413,709 | Hoffman | Jan. 7, 1947 |
| 2,440,378 | Newsome | Apr. 27, 1948 |
| 2,487,076 | Sharp et al. | Nov. 8, 1949 |